United States Patent
Baba et al.

(10) Patent No.: US 8,002,195 B2
(45) Date of Patent: Aug. 23, 2011

(54) RADIO-FREQUENCY IDENTIFICATION TAG

(75) Inventors: Shunji Baba, Kawasaki (JP); Shigeru Hashimoto, Inagi (JP); Yoshiyasu Sugimura, Inagi (JP); Satoru Nogami, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 12/612,412

(22) Filed: Nov. 4, 2009

(65) Prior Publication Data

US 2010/0123011 A1 May 20, 2010

(30) Foreign Application Priority Data

Nov. 17, 2008 (JP) ................... 2008-293822

(51) Int. Cl.
*G06K 19/06* (2006.01)
(52) U.S. Cl. ..... 235/492; 235/488; 235/385; 340/572.1; 340/572.7; 340/572.8; 340/10.1
(58) Field of Classification Search .......... 235/492, 235/488, 385; 340/572.1, 572.7, 572.8, 10.1
See application file for complete search history.

(56) References Cited

U.S. PATENT DOCUMENTS

| | | | |
|---|---|---|---|
| 2006/0290514 A1* | 12/2006 | Sakama et al. | 340/572.7 |
| 2007/0018833 A1* | 1/2007 | Higashionji et al. | 340/572.7 |
| 2008/0042851 A1 | 2/2008 | Baba et al. | |
| 2010/0045437 A1* | 2/2010 | Hioki et al. | 340/10.1 |
| 2010/0060459 A1* | 3/2010 | Stole et al. | 340/572.8 |

FOREIGN PATENT DOCUMENTS

| | | |
|---|---|---|
| EP | 1739597 A2 | 1/2007 |
| JP | 61-204788 A | 9/1986 |
| JP | 11-296642 A | 10/1999 |
| JP | 2002-366918 A | 12/2002 |
| JP | 2005-242723 A | 9/2005 |
| JP | 2006-031089 A | 2/2006 |
| JP | 2007-072829 A | 3/2007 |
| JP | 2008-021033 A | 1/2008 |
| JP | 2008-046668 A | 2/2008 |

OTHER PUBLICATIONS

European Search Report dated Dec. 29, 2009, issued in corresponding European Patent Application No. 09176208.8.

* cited by examiner

*Primary Examiner* — Allyson N Trail
(74) *Attorney, Agent, or Firm* — Westerman, Hattori, Daniels & Adrian, LLP

(57) ABSTRACT

A radio-frequency identification (RFID) tag includes: a plate-shaped sealing piece made of an elastic material. An inlet is enclosed within the sealing piece. The inlet includes an electronic component and an antenna connected to the electronic component. A pair of reinforcing pieces are located respectively on the front and back surfaces of the sealing piece so as to sandwich the electronic component. The reinforcing pieces are made of a first material harder than the elastic material. A joint piece configured to couple the reinforcing pieces to each other. The joint piece is made of a second material harder than the elastic material.

5 Claims, 8 Drawing Sheets

RADIO-FREQUENCY IDENTIFICATION TAG

CROSS-REFERENCE TO RELATED APPLICATION

This application is based upon and claims the benefit of priority from the prior Japanese Patent Application No. 2008-293822 filed on Nov. 17, 2008, the entire contents of which are incorporated herein by reference.

FIELD

The embodiments discussed herein are related to a radio-frequency identification (RFID) tag.

BACKGROUND

An RFID tag is well known. The RFID tag is attached on clothes, for example. The RFID tag includes an inlet airtightly enclosed within a sealing piece. The sealing piece is made of rubber, for example. The inlet includes a semiconductor chip. The RFID tag is configured to transmit and receive a predetermined radio signal in accordance with the operation of the semiconductor chip. A pair of reinforcing pieces is embedded within the sealing piece. The semiconductor chip is interposed between the reinforcing pieces. The reinforcing pieces are made of plastic, for example.

Publication 1: JP Patent Application Laid-open No. 61-204788
Publication 2: JP Patent Application Laid-open No. 2002-366918
Publication 3: JP Patent Application Laid-open No. 2008-021033
Publication 4: JP Patent Application Laid-open No. 2005-242723
Publication 5: JP Patent Application Laid-open No. 2008-046668
Publication 6: JP Patent Application Laid-open No. 2007-072829
Publication 7: JP Patent Application Laid-open No. 11-296642
Publication 8: JP Patent Application Laid-open No. 2006-031089

When the clothes are washed or spin-dried, an RFID tag suffers from stress as a result of twisting, bending, shrinkage or elongation of the clothes. Bending stress is generated in the sealing piece, for example. The reinforcing pieces are configured to absorb the stress. However, since the reinforcing pieces separately absorb the stress, the reinforcing pieces are not allowed to have a sufficient rigidity. Consequently, if the sealing piece suffers from a relatively large stress, the semiconductor chip can be damaged.

SUMMARY

According to an aspect of the invention, a radio-frequency identification tag including: a plate-shaped sealing piece made of an elastic material; an inlet enclosed within the sealing piece, the inlet including an electronic component and an antenna connected to the electronic component; a pair of reinforcing pieces located respectively on the front and back surfaces of the sealing piece so as to sandwich the electronic component, the reinforcing pieces being made of a first material harder than the elastic material; and a joint piece coupling the reinforcing pieces to each other, the joint piece being made of a second material harder than the elastic material.

The object and advantages of the embodiments will be realized and attained by means of the elements and combinations particularly pointed out in the appended claims. It is to be understood that both the foregoing general description and the following detailed description are exemplary and explanatory and are not restrictive of the embodiments, as claimed.

DESCRIPTION OF EMBODIMENT

Embodiments of the present invention will be explained below with reference to the accompanying drawings.

Figure 1:
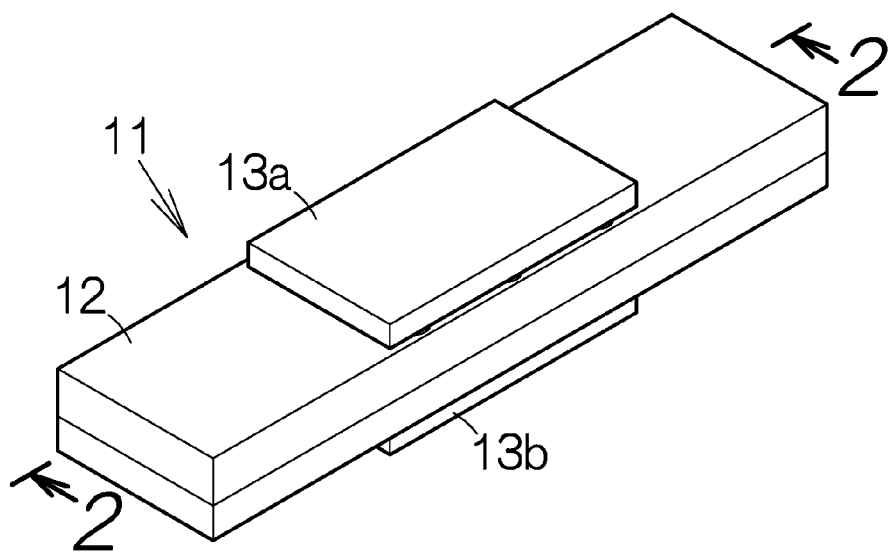
FIG. 1 is a perspective view schematically depicting a radio-frequency identification (RFID) tag according to a first embodiment.

FIG. 1 schematically depicts the exterior of a radio-frequency identification (RFID) tag 11 according to a first embodiment. The RFID tag 11 includes a plate-shaped sealing piece 12, for example. The sealing piece 12 has the shape of a flat parallelepiped, for example. The sealing piece 12 is made of an elastic material such as polyurethane rubber, for example. The sealing piece 12 thus has a predetermined flexibility. A pair of reinforcing pieces 13a, 13b are located on the front and back surfaces of the sealing piece 12, respectively. The reinforcing pieces 13a, 13b are formed in the shape of a plate, for example. The reinforcing pieces 13a, 13b have the shape of a flat parallelepiped, for example.

The reinforcing pieces 13a, 13b are made of a material harder than the elastic material of the sealing piece 12. Here, the reinforcing pieces 13a, 13b are made of a fiber reinforced resin, for example. The fiber reinforced resin contains glass fibers impregnated with epoxy resin, for example. Alternatively, the reinforcing pieces 13a, 13b may be made of any one of resin materials such as polyphenylene sulfide (PPS) resin, polyether ether ketone (PEEK) resin, polyimide (PI) resin and polyetherimide (PEI) resin.

Figure 2:
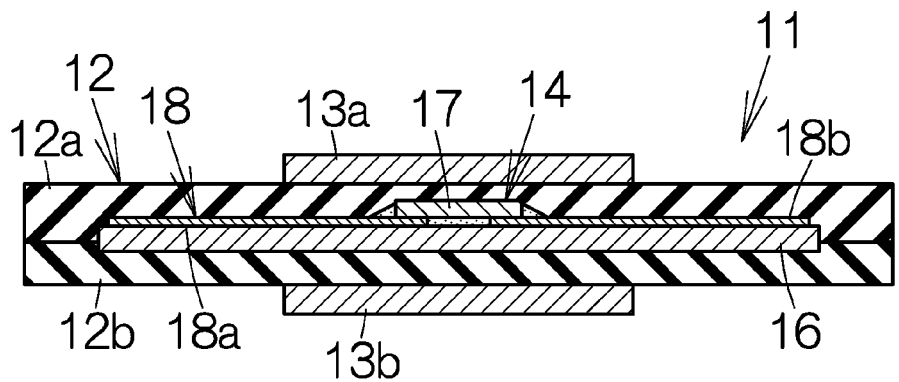
FIG. 2 is a sectional view taken along the line 2-2 in FIG. 1.

As depicted in FIG. 2, an inlet 14 is airtightly enclosed within the sealing piece 12. The inlet 14 is interposed between a pair of thin plates 12a, 12b. The thin plates 12a, 12b in combination function as the sealing piece 12. The thin plates 12a, 12b are bonded to each other. The inlet 14 includes a base 16 of a thin plate. The base 16 is elongated in the longitudinal direction of the sealing piece 12. The base 16 is made of a resin material such as polyethylene terephthalate (PET), for example. An electronic component, namely a semiconductor chip 17, is mounted on the surface of the base 16. An adhesive is utilized to fix the semiconductor chip 17 to the base 16, for example. A transmitter/receiver circuit, logic circuit and a memory for radio communication are incorporated in the semiconductor chip 17, for example. Predetermined information is held in the memory. The semiconductor chip 17 is made of silicon, for example.

An antenna device 18 is also mounted on the surface of the base 16. The antenna device 18 include a pair of antenna wires 18a, 18b. The antenna wires 18a, 18b in combination function as a dipole antenna. The antenna wires 18a, 18b are made of a copper (Cu) foil, for example. Electrical connection is established between one ends of the antenna wires 18a, 18b and the semiconductor chip 17. The antenna wires 18a, 18b extend linearly from the semiconductor chip 17 in the opposite directions to each other. Here, the antenna wires 18a, 18b are elongated in the longitudinal direction of the base 16. Electric power is generated in the semiconductor chip 17 in response to radio waves received at the antenna device 18. The semiconductor chip 17 utilizes the electric power to execute a predetermined operation. The information held in the memory is output from the antenna device 18, for example.

Figure 3:
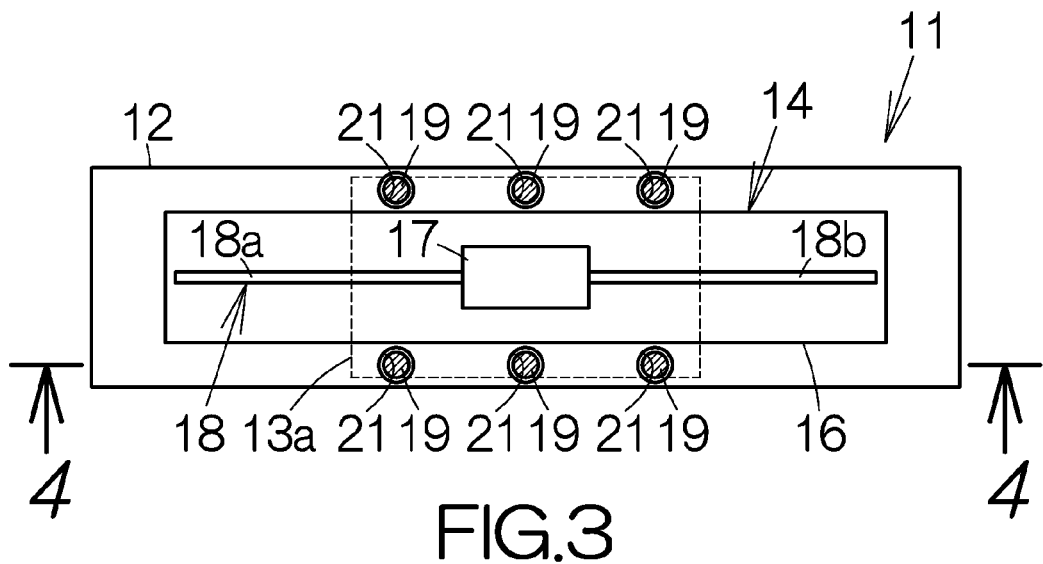
FIG. 3 is a plan view schematically depicting the RFID tag of the first embodiment.

The back surface of the reinforcing piece 13a is overlaid on the front surface of the sealing piece 12. Likewise, the back surface of the reinforcing piece 13b is overlaid on the back surface of the sealing piece 12. The reinforcing pieces 13a, 13b have identical contours. Referring also to FIG. 3, the reinforcing pieces 13a, 13b are overlaid on projection image areas, respectively. The projection image areas are defined along the projected images of the semiconductor chip 17 formed on the front and back surfaces of the sealing piece 12, respectively. Here, the projected image areas are defined inside the contours of the reinforcing pieces 13a, 13b. The contours of the reinforcing pieces 13a, 13b extend larger than the projected image areas around the projected image areas, respectively. The semiconductor chip 17 is in this manner interposed between the reinforcing pieces 13a, 13b.

Figure 4:
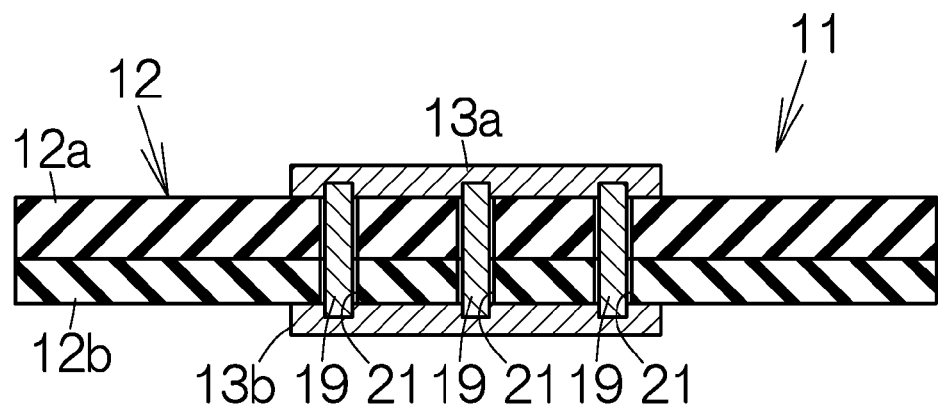
FIG. 4 is a sectional view taken along the line 4-4 in FIG. 3.

Joint pieces 19 are utilized to couple the reinforcing pieces 13a, 13b to each other, for example. The joint pieces 19 are arranged in two rows each having three joint pieces 19, for example. The base 16, namely the inlet 14, is located between the rows of the joint pieces 19, for example. The joint pieces 19 are made of a material harder than the elastic material of the sealing piece 12. Here, the joint pieces 19 and the reinforcing pieces 13a, 13b are made of the same material. The individual joint piece 19 is formed in the shape of a column extending in the direction of the thickness of the sealing piece 12, in other words, in the direction perpendicular to the front and back surfaces of the sealing piece 12, for example. Referring also to FIG. 4, the joint pieces 19 are received in through holes 21 each defining a columnar space inside, for example. The through holes 21 penetrate from the front surface of the sealing piece 12 to the back surface of the sealing piece 12. Here, the through holes 21 are located at positions outside the contour of the inlet 14.

The RFID tag 11 is attached to clothes, for example. When the clothes are washed, the sealing piece 12 is bent as a result of twisting of the clothes. Bending stress is thus generated in the sealing piece 12. The joint pieces 19 are utilized to couple the reinforcing pieces 13a, 13b to each other. The reinforcing pieces 13a, 13b are thus allowed to have a sufficient rigidity. Since the semiconductor chip 17 is interposed between the reinforcing pieces 13a, 13b, generation of stress is prevented in a space between the reinforcing pieces 13a, 13b, namely at the semiconductor chip 17. This results in avoidance of damages to the semiconductor chip 17. Moreover, since the joint pieces 19 are utilized to couple the reinforcing pieces 13a, 13b to each other, a coating material is not required to cover the reinforcing pieces 13a, 13b on the front and back surfaces of the sealing piece 12. An increase in the production cost of the RFID chip 11 can be suppressed. Simultaneously, the thickness of the RFID chip 11 can be reduced.

Figure 5:
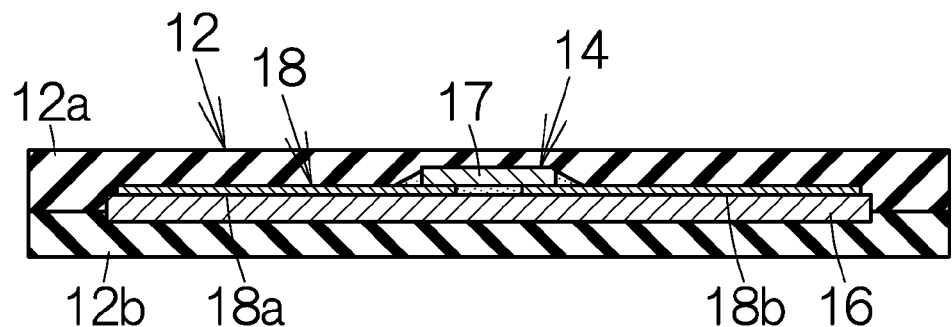
FIG. 5 is a sectional view schematically depicting a process of airtightly enclosing an inlet within a sealing piece.
Figure 6:
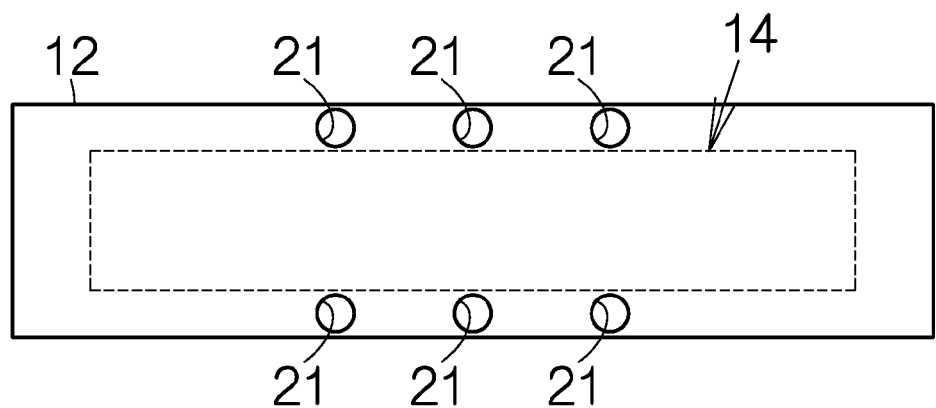
FIG. 6 is a plan view schematically depicting a process of forming through holes in the sealing piece.

Next, description will be made on a method of making the RFID tag 11. Here, the inlet 14 is first prepared. As depicted in FIG. 5, the inlet 14 is interposed between the thin plates 12a, 12b. Thermocompression bonding is employed to bond the thin plates 12a, 12b to each other, for example. The inlet 14 is airtightly enclosed between the thin plates 12a, 12b, namely within the sealing piece 12. As depicted in FIG. 6, the through holes 21 are formed in the sealing piece 12. The through holes 21 penetrate from the front surface of the sealing piece 12 to the back surface of the sealing piece 12. The through holes 21 are formed at positions outside the contour of the inlet 14. A punch may be employed to punch the sealing piece 12 to form the through holes 21, for example.

Figure 7:
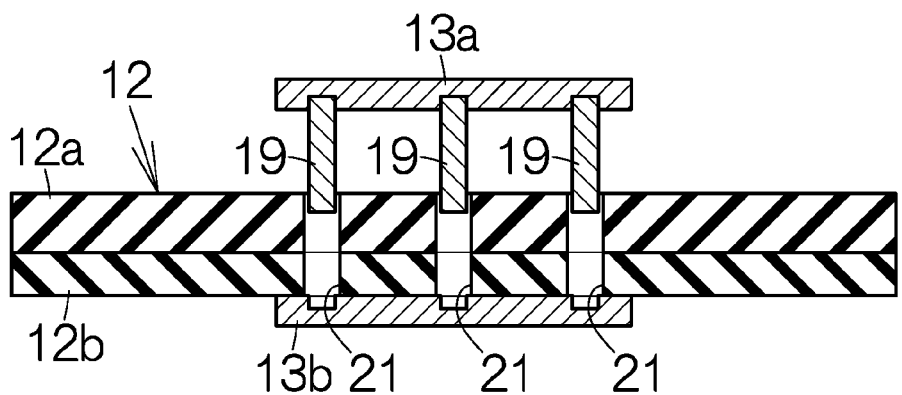
FIG. 7 is a sectional view schematically depicting a process of attaching reinforcing pieces to the sealing piece.

As depicted in FIG. 7, the reinforcing piece 13b is overlaid on the back surface of the sealing piece 12 at a predetermined position. One ends of the joint pieces 19 have been bonded to the reinforcing piece 13a, for example. The joint pieces 19 are inserted in the through holes 21, respectively. The reinforcing piece 13a is overlaid on the front surface of the sealing piece 12. The other ends of the joint pieces 19 are bonded to the reinforcing piece 13b. Application of an adhesive or a heat welding technique may be utilized to bond the joint pieces 19 to the reinforcing pieces 13a, 13b, for example. The RFID tag 11 is in this manner produced. It should be noted that the joint pieces 19 may be formed integral with the reinforcing piece 13a based on molding, for example.

The method allows establishment of the through holes 21 in the sealing piece 12 prior to the attachment of the reinforcing pieces 13a, 13b. The joint pieces 19 have beforehand been bonded to the reinforcing piece 13a. The insertion of the joint pieces into the respective through holes 21 enables an easier positioning of the reinforcing piece 13a relative to the sealing piece 12, specifically the semiconductor chip 17. The through holes 21 are formed at accurate positions relative to the semiconductor chip 17 by using a punch, for example. Therefore, the reinforcing piece 13a is positioned relative to the semiconductor chip 17 with accuracy in a facilitated manner. Likewise, the reinforcing piece 13b is positioned relative to the joint pieces 19 in a facilitated manner. The reinforcing piece 13b is positioned relative to the semiconductor chip 17 with accuracy.

Figure 8:
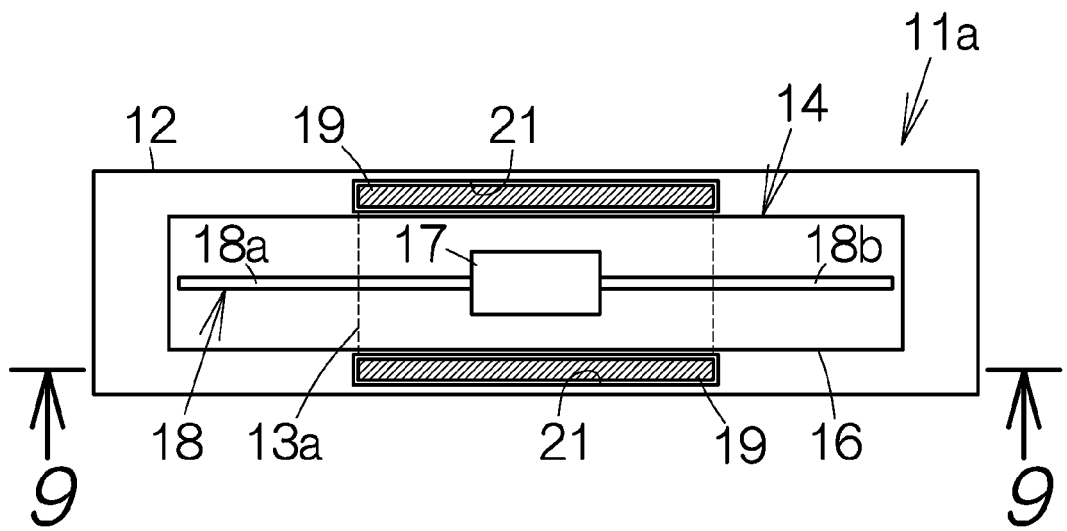
FIG. 8 is a plan view schematically depicting an RFID tag according to a second embodiment.
Figure 9:
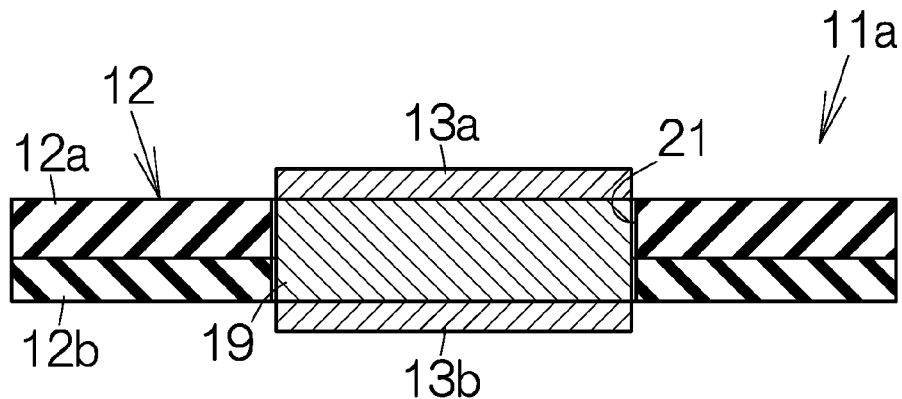
FIG. 9 is a sectional view taken along the line 9-9 in FIG. 8.

FIG. 8 schematically depicts an RFID tag 11a according to a second embodiment. The RFID tag 11a is configured to employ the joint pieces 19 each made of a single wall or block. The joint piece 19 has the contour of a flat parallelepiped, for example. Referring also to FIG. 9, the joint pieces 19 are received in the through holes 21, respectively. The through holes 21 are located at positions outside the contour of the inlet 14. Like reference numerals are attached to the structure or components equivalent to those of the aforementioned RFID tag 11. The RFID tag 11a is allowed to enjoy the advantages identical to those obtained in the aforementioned RFID tag 11. The RFID tag 11a is produced in the same manner as the aforementioned RFID tag 11.

Figure 10:
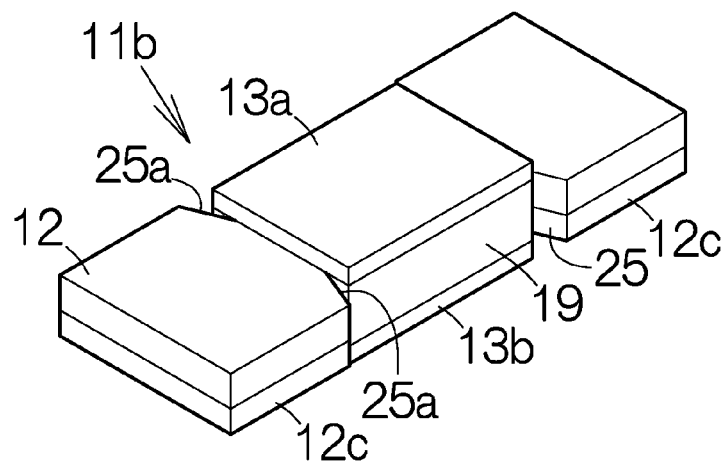
FIG. 10 is a perspective view schematically depicting an RFID tag according to a third embodiment.
Figure 11:
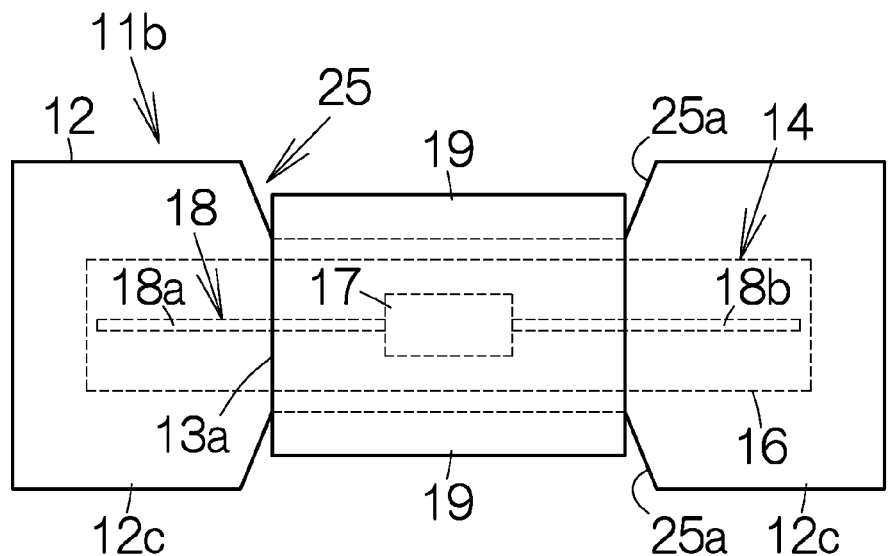
FIG. 11 is a plan view schematically depicting the RFID tag of the third embodiment.
Figure 12:
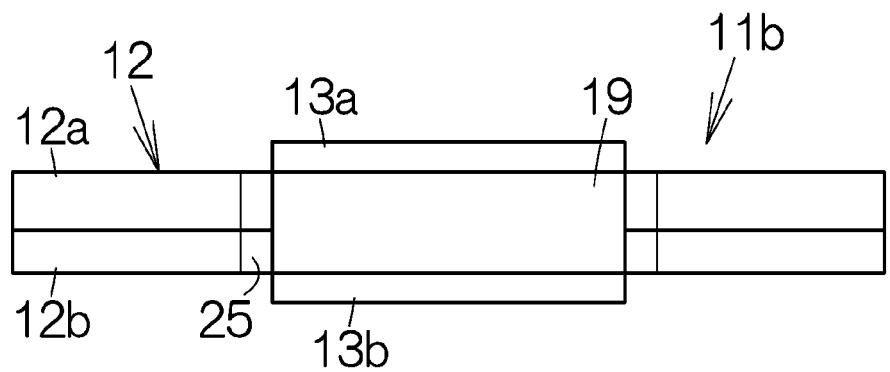
FIG. 12 is a side view schematically depicting the RFID tag of the third embodiment.

FIG. 10 schematically depicts an RFID tag 11b according to a third embodiment. A constriction 25 is formed in the sealing piece 12 of the RFID tag 11b between enlarged end portions. The constriction 25 is configured to describe recessed contours 25a, 25a of the sealing piece 12. The recessed contours 25a, 25a are recessed inward from a rectangular shape matched with the enlarged end portions 12c, 12c of the sealing piece 12. Referring also to FIG. 11, the constriction 25 may become narrower as the position gets farther from the enlarged end portions 12c, 12c of the sealing piece 12, for example. The recessed contours 25a, 25a include lines extending in parallel with the longitudinal edges of the base 16, respectively, so as to define the narrowest portion. Referring also to FIG. 12, the joint pieces 19 are received in the recessed contours 25a, 25a. The individual joint piece 19 is a single wall, for example. The constriction 25 is interposed between the joint pieces 19, 19. As a result, the reinforcing pieces 13a, 13b and the joint pieces 19 surrounds the constriction 25. The reinforcing pieces 13a, 13b and the joint pieces 19 are thus prevented from dropping off the sealing piece 12. Like reference numerals are attached to the structure or components equivalent to those of the aforementioned RFID tags 11, 11a. The RFID tag 11b is allowed to enjoy the advantages identical to those obtained in the aforementioned RFID tag 11a.

Figure 13:
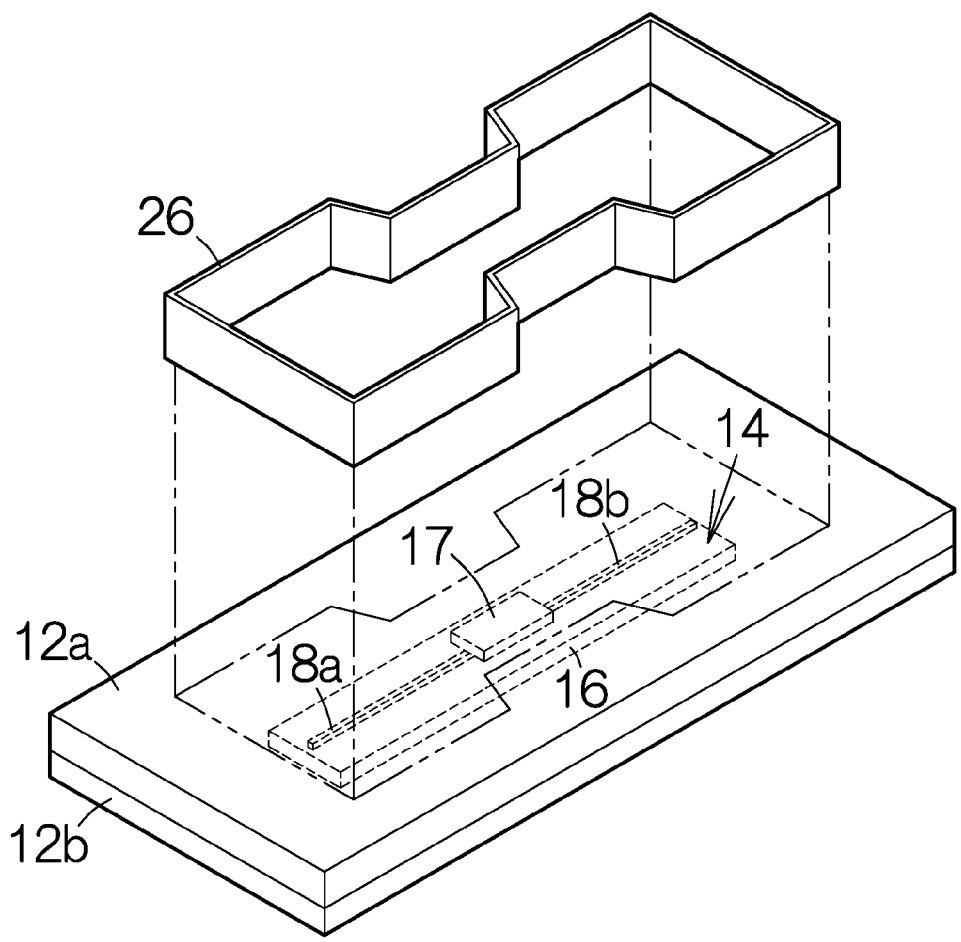
FIG. 13 is a perspective view schematically depicting a process of cutting out the contour of the sealing piece.

Next, description will be made on a method of making the RFID tag 11b. The inlet 14 is airtightly enclosed between the thin plates 12a, 12b based on thermocompression bonding, for example, in the same manner as described above. The contours of the thin plates 12a, 12b at this stage are larger than those of the thin plates 12a, 12b for a final product. As depicted in FIG. 13, a cutter 26 is used to cut out the contour of the sealing piece 12. The cutter 26 defines the contour of the sealing piece 12. In this manner, the constriction 25 is formed in the contour of the sealing piece 12. The reinforcing piece 13b is then located on the back surface of the sealing piece 12 in the same manner as described above. One ends of the joint pieces 19 have beforehand been bonded to the reinforcing piece 13a. The joint pieces 19 are received in spaces of the recessed contours 25a, 25a, respectively. The other ends of the joint pieces 19 are bonded to the reinforcing piece 13b. The RFID tag 11b is in this manner produced. The method enables reception of the joint pieces 19 in the recessed contours 25a, 25a for an easier positioning of the reinforcing pieces 13a, 13b relative to the semiconductor chip 17.

Figure 14:
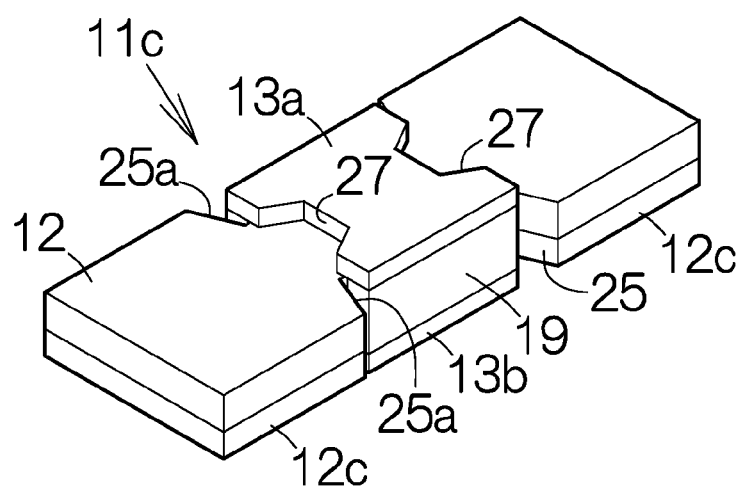
FIG. 14 is a perspective view schematically depicting an RFID tag according to a fourth embodiment.
Figure 15:
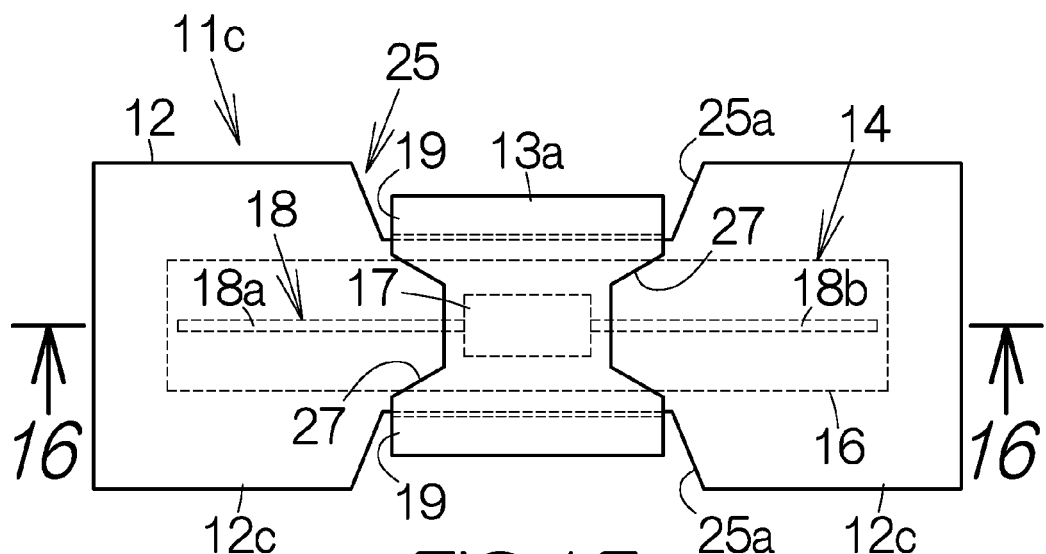
FIG. 15 is a plan view schematically depicting the RFID tag of the fourth embodiment.
Figure 16:
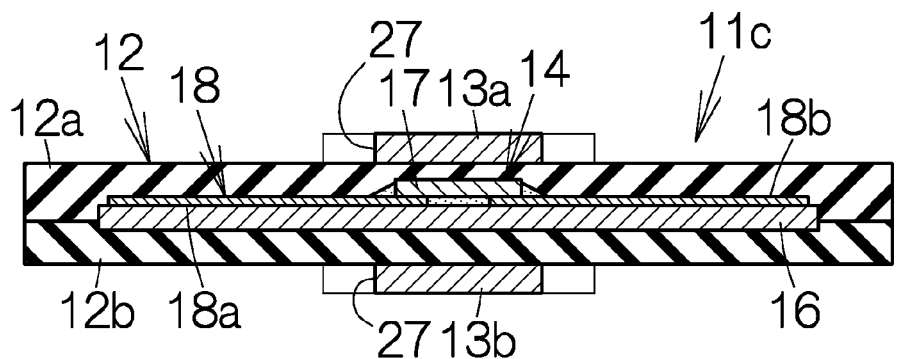
FIG. 16 is a sectional view taken along the line 16-16 in FIG. 15.

FIG. 14 schematically depicts an RFID tag 11c according to a fourth embodiment. The RFID tag 11c includes a pair of recesses 27, 27 formed in the reinforcing pieces 13a, 13b of the aforementioned RFID tag 11b. Referring also to FIG. 15, the recesses 27 are configured to describe recessed contours of the reinforcing piece 13a(13b) and to intersect the antenna wire 18a(18b). Specifically, the recesses 27 are recessed in the direction of the antenna wire 18a(18b). The recesses 27, 27 become narrower as the position gets farther from the corresponding enlarged end portions 12c, 12c, for example. Referring also to FIG. 16, the inner peripheries of the recesses 27 are defined within perpendicular planes standing upright from the front and back surfaces of the sealing piece 12. Like reference numerals are attached to the structure or components equivalent to those of the aforementioned RFID tag 11b.

Figure 17:
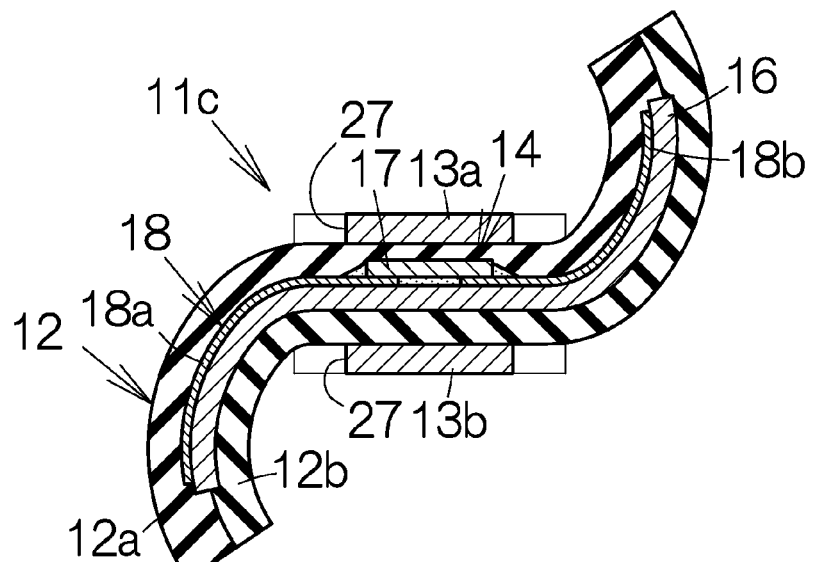
FIG. 17 is a sectional view schematically depicting deformation of the RFID tag of the fourth embodiment.

When the clothes are washed, the sealing piece 12 of the RFID tag 11c is bent as a result of twisting of the clothes, as depicted in FIG. 17. The antenna wires 18a, 18b are forced to bend. The sealing piece 12 is forced to bend around the side edges of the reinforcing pieces 13a, 13b at positions outside the recesses 27. The sealing piece 12 suffers from bending stress concentrated on the side edges of the reinforcing pieces 13a, 13b. Even in such a situation, since the sealing piece 12 is made of an elastic material such as polyurethane rubber, damages to the sealing piece 12 are avoided. The recesses 27 are configured to describe the recessed contours of the reinforcing pieces 13a, 13b in the direction interesting the antenna wire 18a(18b). As a result, the sealing piece 12 is prevented from contacting with the side edges of the reinforcing pieces 13a, 13b. Concentration of the bending stress is avoided. Tight bending of the antenna wires 18a, 18b is restricted. This results in avoidance of breaking of the antenna wires 18a, 18b. The reinforcing pieces 13a, 13b are still allowed to extend over a relatively wide area irrespective of the formation of the recesses 27. The reinforcing pieces 13a, 13b are thus allowed to have a sufficient rigidity. Generation of the stress is reliably suppressed in the sealing piece 12 at a position adjacent to the semiconductor chip 17.

Figure 18:
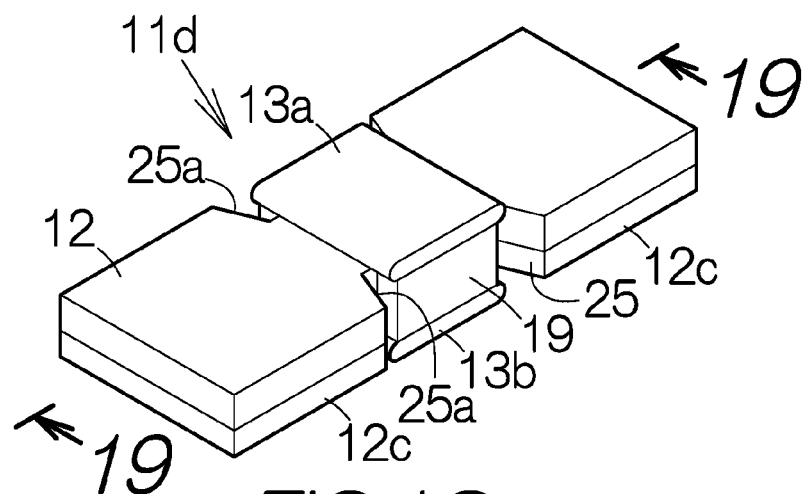
FIG. 18 is a perspective view schematically depicting an RFID tag according to a fifth embodiment.
Figure 19:
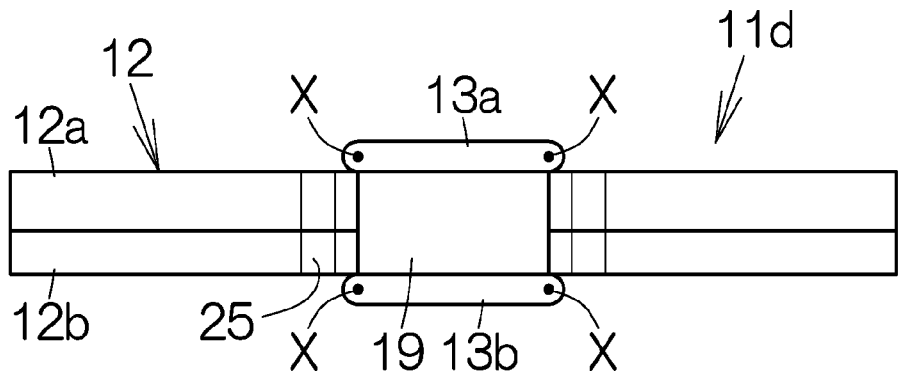
FIG. 19 is a side view taken along the line 19-19 in FIG. 18.

FIG. 18 schematically depicts an RFID tag 11d according to a fifth embodiment. The RFID tag 11d includes rounded edges formed in the reinforcing pieces 13a, 13b of the aforementioned RFID tag 11b. Referring also to FIG. 19, the rounded edges of the reinforcing pieces 13a, 13b extend in a direction intersecting the antenna wires 18a, 18b at right angles so as to define the contour of the reinforcing pieces 13a, 13b. Here, curved surfaces are defined at the side edges of the reinforcing pieces 13a, 13b. The curved surfaces are configured to have generatrices extending in parallel with the center axes X intersecting the antenna wires 18a, 18b, respectively, at right angles. The individual center axis X is equally spaced from the front and back surfaces of the reinforcing piece 13a(13b). Like reference numerals are attached to the structure or components equivalent to those of the aforementioned RFID tag 11b.

Figure 20:
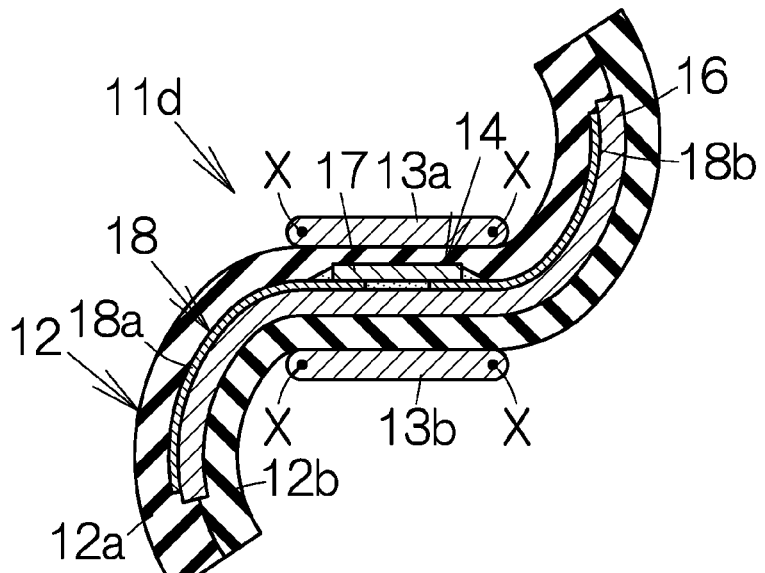
FIG. 20 is a sectional view schematically depicting deformation of the RFID tag of the fifth embodiment.

When the clothes are washed, the sealing piece 12 of the RFID tag 11d is forced to bend as a result of twisting of the clothes. The antenna wires 18a, 18b are thus forced to bend. The rounded edges are formed as the side edges of the reinforcing pieces 13a, 13b extending in the direction intersecting the antenna wires 18a, 18b at right angles. Consequently, the antenna wires 18a, 18b are forced to bend along the curved surfaces, as depicted in FIG. 20. Tight bending of the antenna wires 18a, 18b is restricted. This results in avoidance of breaking of the antenna wires 18a, 18b. The reinforcing pieces 13a, 13b are still allowed to extend on the front and back surfaces of the sealing piece 12 over a relatively large area. The reinforcing pieces 13a, 13b are thus allowed to have a sufficient rigidity. Generation of the stress is reliably suppressed in the sealing piece 12 at a position adjacent to the semiconductor chip 17.

Figure 21:
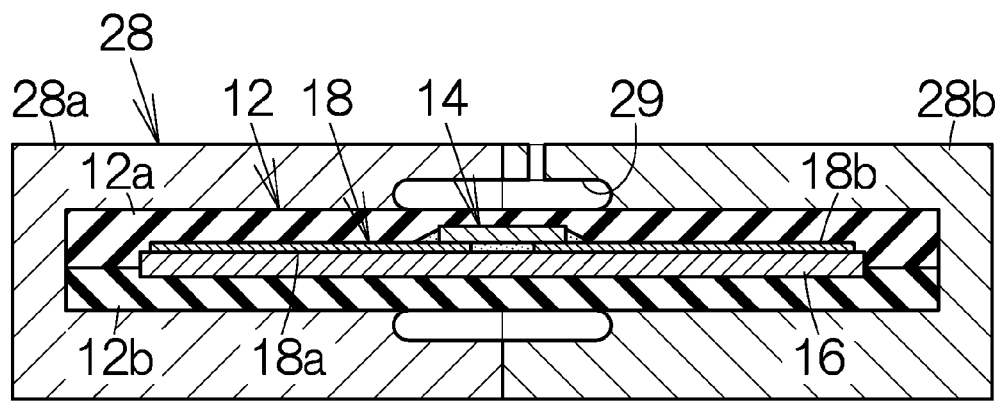
FIG. 21 is a sectional view schematically depicting a process of molding the reinforcing pieces and the joint pieces together in a mold.

Next, description will be made on a method of making the RFID tag 11d. The inlet 14 is airtightly enclosed between the thin plates 12a, 12b based on thermocompression bonding, for example, in the same manner as described above. The thin plates 12a, 12b, namely the sealing piece 12, are set in a cavity 29 of a mold 28, made of a metal material, as depicted in FIG. 21. The mold 28 includes a first mold 28a and a second mold 28b. The first mold 28a and the second mold 28b are coupled to each other at a coupling surface extending in the direction perpendicular to the front and back surfaces of the sealing piece 12. A space is defined in the cavity 29 at a position outside the sealing piece 12. The space defines the externals or contours of the reinforcing pieces 13a, 13b and the joint pieces 19. Predetermined blocks are nested in the cavity 29 to form such a space. The aforementioned resin material is poured into the space. When the resin material is hardened or cured, the reinforcing pieces 13a, 13b and the joint pieces 19 are formed. The RFID tad 11d is in this manner produced.

Figure 22:
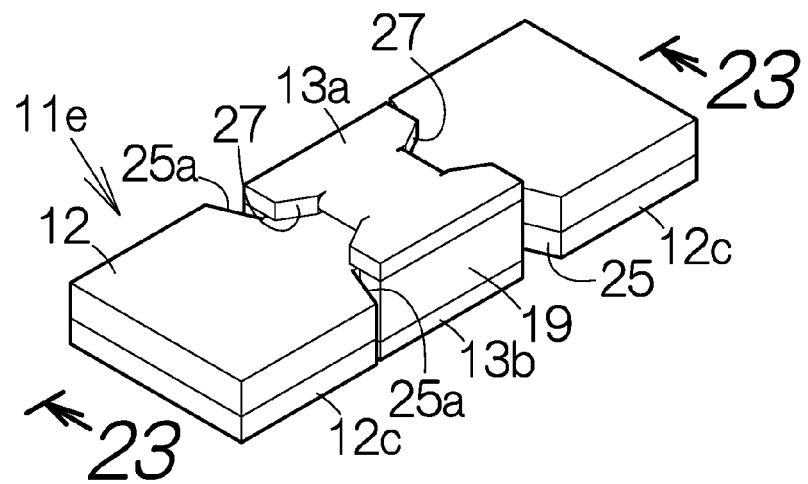
FIG. 22 is a perspective view schematically depicting an RFID tag according to a sixth embodiment.
Figure 23:
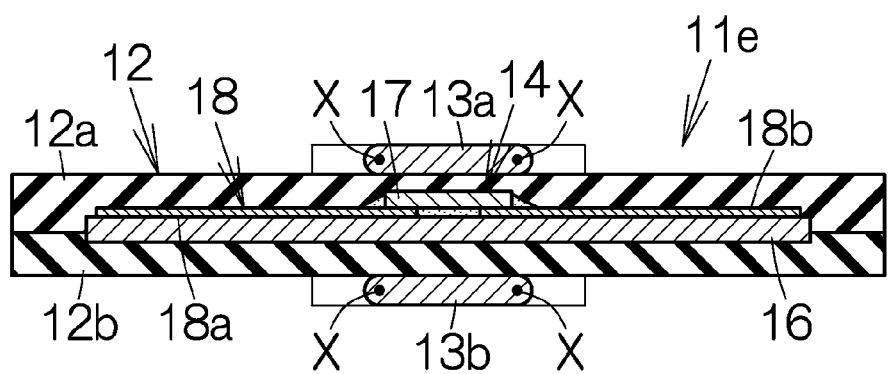
FIG. 23 is a sectional view taken along the line 23-23 in FIG. 22.

FIG. 22 schematically depicts an RFID tag 11e according to a sixth embodiment. The RFID tag 11e includes rounded edges formed in the reinforcing pieces 13a, 13b inside the recesses 27, 27 of the aforementioned RFID tag 11c. The rounded edges inside the recesses 27, 27 extend in a direction intersecting the antenna wires 18a, 18b at right angles so as to define the contour of the reinforcing pieces 13a, 13b. Referring also to FIG. 23, curved surfaces are configured to have generatrices extending in parallel with the center axes X intersecting the antenna wires 18a, 18b, respectively, at right angles. The individual center axis X is equally spaced from the front and back surfaces of the reinforcing piece 13a(13b). Like reference numerals are attached to the structure or components equivalent to those of the aforementioned RFID tag 11c. The RFID tag 11e is allowed to enjoy the advantages identical to those obtained in the aforementioned RFID tags 11c, 11d.

The recesses 27, 27 may be formed in the reinforcing pieces 13a, 13b of any one of the aforementioned RFID tags 11, 11a. Likewise, the rounded edges may be formed in the reinforcing pieces 13a, 13b of any one of the aforementioned RFID tags 11, 11a. The sealing piece 12, the reinforcing pieces 13a, 13b, the joint pieces 19, the constriction 25 and the recesses 27 can take any shape or form different from the described ones. Molding process may be employed to form the reinforcing pieces 13a, 13b and the joint pieces 19 in the RFID tags 11, 11a, 11b, 11c in the same manner as in the RFID tag 11d.

All examples and conditional language recited herein are intended for pedagogical purposes to aid the reader in understanding the invention and the concept contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio-frequency identification tag comprising:
   a plate-shaped sealing piece made of an elastic material;
   an inlet enclosed within the sealing piece, the inlet including an electronic component and an antenna connected to the electronic component;
   a pair of reinforcing pieces located respectively on front and back surfaces of the sealing piece so as to sandwich the electronic component, the reinforcing pieces being made of a first material harder than the elastic material; and
   a joint piece located outside a contour of the sealing piece to couple the reinforcing pieces to each other, the joint piece being made of a second material harder than the elastic material.

2. The radio-frequency identification tag according to claim 1, further comprising a constriction formed in the sealing piece, the constriction describing a recessed contour of the sealing piece for receiving the joint piece.

3. The radio-frequency identification tag according to claim 1, further comprising recesses formed in the reinforcing pieces, the recesses describing recessed contours of the reinforcing pieces and extending across the antenna.

4. The radio-frequency identification tag according to claim 1, wherein the reinforcing pieces has rounded edges extending in a direction intersecting across the antenna so as to define a contour of the reinforcing pieces.

5. A radio-frequency identification tag, comprising:
   a plate-shaped sealing piece made of an elastic material;
   an inlet enclosed within the sealing piece, the inlet including an electronic component and an antenna connected to the electronic component;
   a pair of reinforcing pieces located respectively on front and back surfaces of the sealing piece so as to sandwich the electronic component, the reinforcing pieces being made of a first material harder than the elastic material;
   a joint piece coupling the reinforcing pieces to each other, the joint piece being made of a second material harder than the elastic material; and
   a through hole penetrating from the front surface of the sealing piece to the back surface of the sealing piece, the through hole receiving the joint piece therein.

* * * * *